(12) United States Patent
Kidera et al.

(10) Patent No.: US 11,968,346 B2
(45) Date of Patent: Apr. 23, 2024

(54) COLOR CORRECTION APPARATUS, IMAGE FORMING APPARATUS, METHOD OF CONTROLLING COLOR CORRECTION APPARATUS, AND NON-TRANSITORY RECORDING MEDIUM STORING COMPUTER READABLE PROGRAM

(71) Applicant: KONICA MINOLTA, INC., Tokyo (JP)

(72) Inventors: Hiroshige Kidera, Hachioji (JP); Daiki Yamanaka, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/124,538

(22) Filed: Mar. 21, 2023

(65) Prior Publication Data
US 2023/0336677 A1 Oct. 19, 2023

(30) Foreign Application Priority Data
Apr. 18, 2022 (JP) .................................. 2022-068369

(51) Int. Cl.
*H04N 1/60* (2006.01)
(52) U.S. Cl.
CPC .............. *H04N 1/6033* (2013.01); *H04N 1/60* (2013.01); *H04N 1/6002* (2013.01)

(58) Field of Classification Search
USPC ....................................................... 358/3.24
See application file for complete search history.

(56) References Cited

U.S. PATENT DOCUMENTS

| 2005/0094170 | A1* | 5/2005 | Ichitani | H04N 1/6033 358/1.9 |
| 2008/0193181 | A1* | 8/2008 | Jeong | H04N 1/00578 399/401 |
| 2015/0202883 | A1* | 7/2015 | Kojima | H04N 1/6097 347/14 |
| 2016/0212305 | A1* | 7/2016 | Sakai | H04N 1/46 |

FOREIGN PATENT DOCUMENTS

JP  6424672 B2  11/2018

* cited by examiner

*Primary Examiner* — Jacky X Zheng
(74) *Attorney, Agent, or Firm* — Squire Patton Boggs (US) LLP

(57) ABSTRACT

A color correction apparatus has: an obtaining unit that obtains first color information of a first image formed by a first color formed on a recording medium and second color information of a second image formed by a second color superimposed on the first color formed on the recording medium; and a correction unit that finds a correction value for the second color by estimating color information of the second color based on the first color information and the second color information, the color information of the second color being varied due to an influence in correcting the first color information to a first target value of the first color.

16 Claims, 11 Drawing Sheets

FIG.3
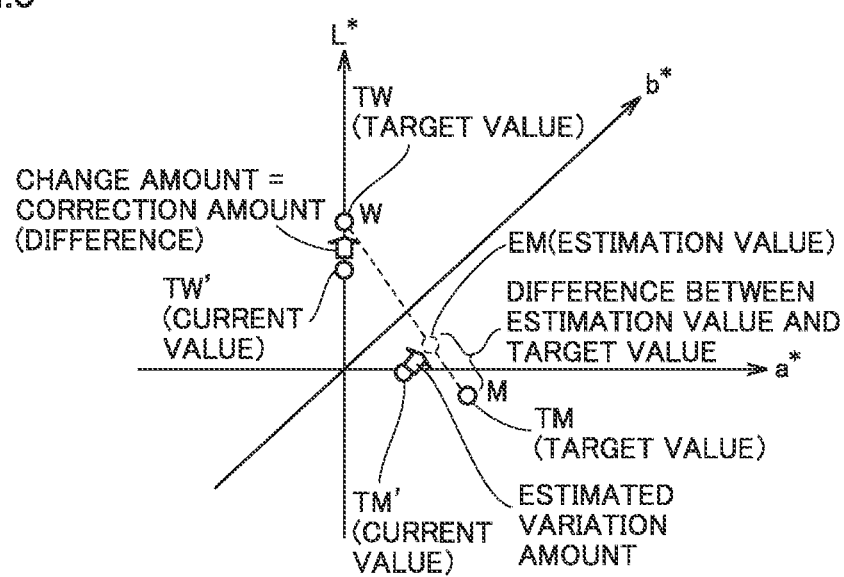

FIG.8

INFLUENCE COEFFICIENT STORAGE UNIT — 33

SHEET TYPE: C

SHEET TYPE: B

SHEET TYPE: A
INFLUENCE COEFFICIENT TABLE (FOUNDATION COLOR: 100%-WHITE)

|   | GRADATION 100% | | | | GRADATION 50% | | | |
|---|---|---|---|---|---|---|---|---|
|   | Y | M | C | K | Y | M | C | K |
| L* | 0.39 | 0.27 | 0.14 | 0.11 | 0.37 | 0.83 | 0.76 | 0.84 |
| a* | 0.18 | 1.36 | 0.04 | -0.01 | 0.16 | 0.22 | 0.00 | 0.04 |
| b* | 1.78 | 0.31 | -0.97 | 0.00 | 0.42 | 0.18 | -0.23 | 0.00 |

FIG.9

| WHITE L* ADHESION AMOUNT | WHITE L* CHANGE AMOUNT | Y | | | M | | | C | | | K | | |
|---|---|---|---|---|---|---|---|---|---|---|---|---|---|
| | | L* | a* | b* | L* | a* | b* | L* | a* | b* | L* | a* | b* |
| AMOUNT 1 | 7.4 | ... | | | ... | | | ... | | −41 | | | |
| AMOUNT 2 | 5.2 | ... | | | ... | | | ... | | −40 | | | |
| AMOUNT 3 | 0 | ... | | | ... | | | ... | | −37 | | | |
| AMOUNT 4 | −5.5 | | | | | | | | | −31 | | | |

REFERENCE AMOUNT OF ADHESION OF FOUNDATION COLOR

70 { 72 UPPER LAYER COLOR / 71 FOUNDATION COLOR } S

CHANGE AMOUNT OF ADHESION OF FOUNDATION TO A PLURALITY OF LEVELS WITHOUT CHANGING AMOUNT OF ADHESION OF TONER OF UPPER LAYER COLOR, AND MEASURE Lab VALUE (L*, a*, b*) OF UPPER LAYER COLOR AT EACH LEVEL

COLOR CORRECTION APPARATUS, IMAGE FORMING APPARATUS, METHOD OF CONTROLLING COLOR CORRECTION APPARATUS, AND NON-TRANSITORY RECORDING MEDIUM STORING COMPUTER READABLE PROGRAM

The entire disclosure of Japanese Patent Application No. 2022-068369, filed on Apr. 18, 2022, is incorporated herein by reference in its entirety.

BACKGROUND

Technological Field

The present disclosure relates to a color correction apparatus, an image forming apparatus, a method of controlling the color correction apparatus, and a non-transitory recording medium storing a computer readable program, and more particularly to color correction.

Description of the Related Art

Conventionally, an image forming apparatus may form, on a recording medium, a multilayer image in which a second image of a second color is superimposed on a portion of a first image of a first color. In this case, the first image is a foundation image under the second image.

Japanese Patent No. 6424672 describes that when a test image is formed on such a foundation image, unevenness in density of the foundation image influences a measurement result of density of the test image.

SUMMARY

In the color correction apparatus described in Japanese Patent No. 6424672, the upper layer color is corrected after the lower layer color is corrected. Therefore, conventionally, efficiency of color correction is lows and it takes time to perform the color correction, disadvantageously.

The present disclosure has been made in view of the above problem. An object in one aspect of the present disclosure is to increase processing efficiency of color correction when forming, on a recording medium, a multilayer image in which a second image of a second color is superimposed on a portion of a first image of a first color.

To achieve at least one of the abovementioned objects, according to an aspect of the present invention, a color correction apparatus reflecting one aspect of the present invention comprises: an obtaining unit that obtains first color information of a first image formed by a first color formed on a recording medium and second color information of a second image formed by a second color superimposed on the first color formed on the recording medium; and a correction unit that finds a correction value for the second color by estimating color information of the second color based on the first color information and the second color information, the color information of the second color being varied due to an influence in correcting the first color information to a first target value of the first color.

To achieve at least one of the abovementioned objects, according to an aspect of the present invention, a method of controlling a color correction apparatus reflecting one aspect of the present invention comprises: obtaining first color information of a first image formed by a first color formed on a recording medium and second color information of a second image formed by a second color superimposed on the first color formed on the recording medium; and finding a correction value for the second color by estimating color information of the second color based on the first color information and the second color information, the color information of the second color being varied due to an influence in correcting the first color information to a first target value of the first color.

To achieve at least one of the abovementioned objects, according to an aspect of the present invention, a non-transitory recording medium storing a computer readable program reflecting one aspect of the present invention comprises a program instruction for causing a computer to perform a method of controlling a color correction apparatus, the method including: obtaining first color information of a first image formed by a first color formed on a recording medium and second color information of a second image formed by a second color superimposed on the first color formed on the recording medium; and finding a correction value for the second color by estimating color information of the second color based on the first color information and the second color information, the color information of the second color being varied due to an influence in correcting the first color information to a first target value of the first color.

The above and other objects, features, aspects, and advantages of the present invention will be apparent from the following detailed description of the present invention understood in connection with the accompanying drawings.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3 is a diagram for illustrating a principle of color correction according to the present embodiment.

FIG. 8 is a diagram showing an influence coefficient table stored in an influence coefficient storage unit.

FIG. 9 is a diagram for illustrating data obtained to calculate an influence coefficient.

DETAILED DESCRIPTION OF EMBODIMENTS

Figure 1:
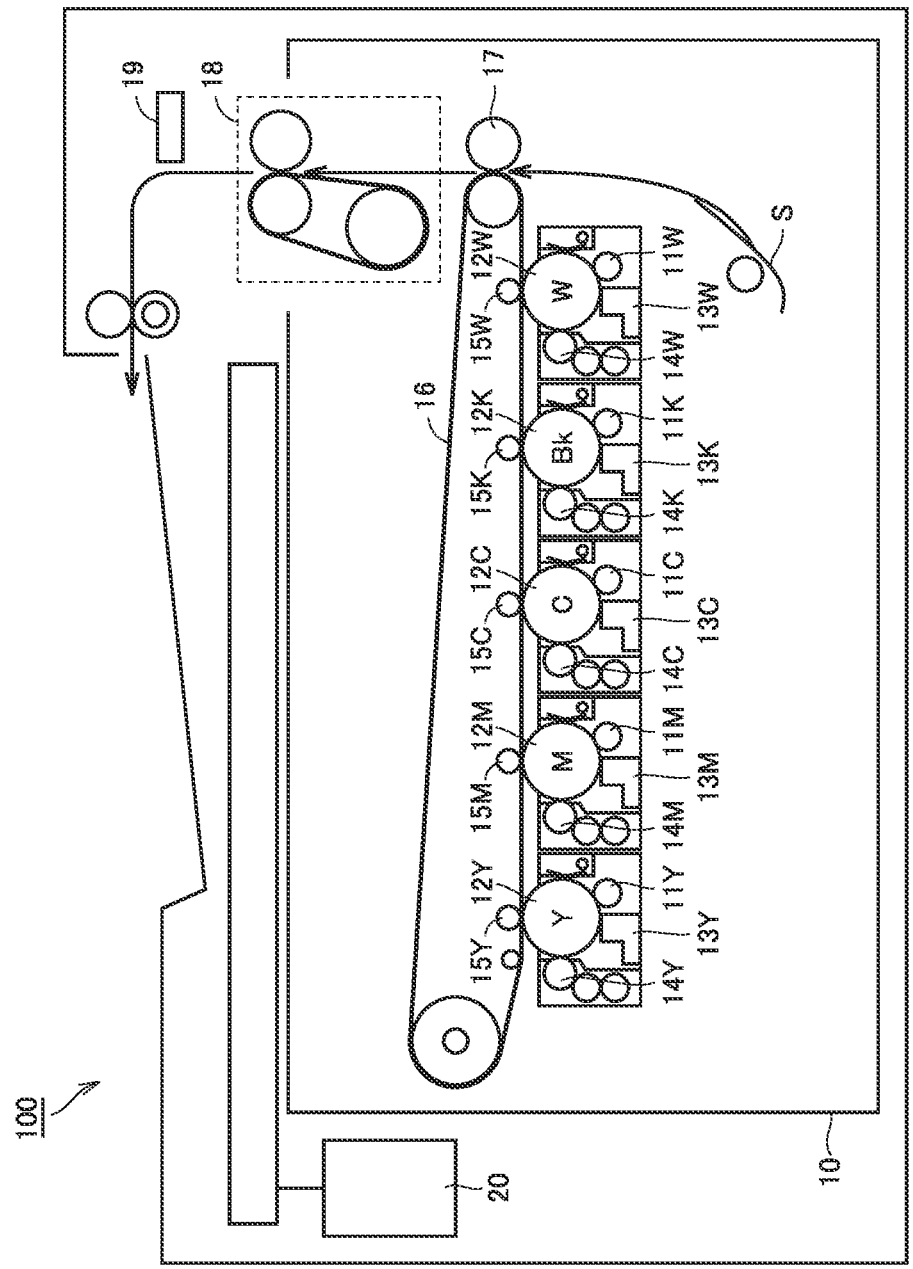
FIG. 1 is a cross sectional view conceptually showing an exemplary overall configuration of an image forming apparatus.

Hereinafter, one or more embodiments of the present invention will be described with reference to the drawings. However, the scope of the invention is not limited to the disclosed embodiments.

Hereinafter, embodiments will be described in detail with reference to figures. Components, types, combinations, shapes, and relative arrangements of the components as described below are not intended to limit them unless particularly stated otherwise. For example, in the description below, an image forming apparatus 100 serving as a color printer will be illustratively described; however, image forming apparatus 100 of the present disclosure is not limited to the color printer. For example, image forming apparatus 100 may be a monochrome printer. Image forming apparatus 100 may be a multifunction peripheral (M P) including a monochrome printer, a color printer, and a facsimile. It should be noted that in the description below, the same or corresponding portions are denoted by the same reference characters, and may not be described repeatedly.

[Overall Configuration of Image Forming Apparatus]

Figure 2:
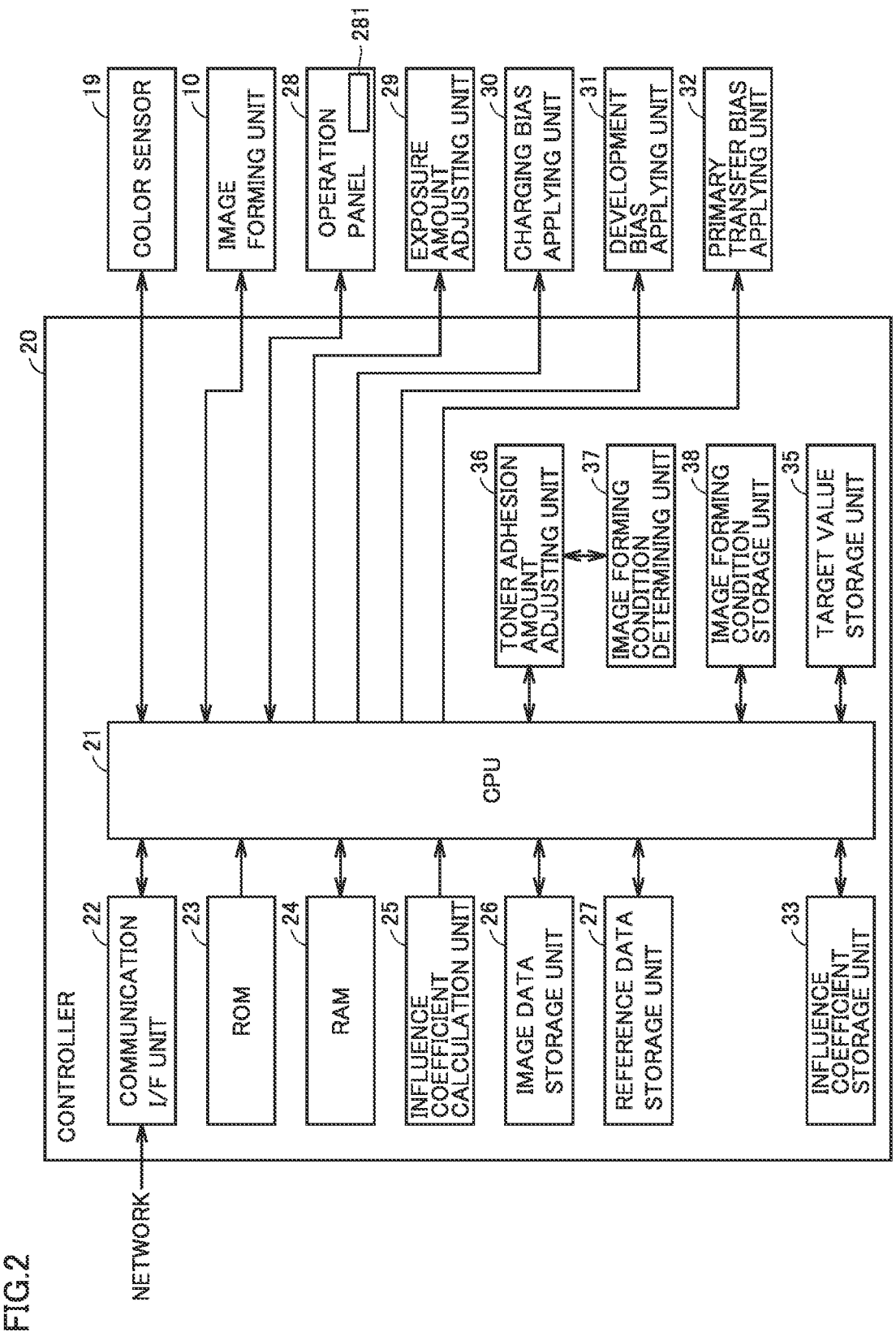
FIG. 2 is a block diagram showing a configuration of a controller of the image forming apparatus.

FIG. 1 is a cross sectional view conceptually showing an exemplary overall configuration of image forming apparatus 100. FIG. 2 is a block diagram showing a configuration of a controller 20 of image forming apparatus 100 shown in FIG. 1.

Referring to FIGS. 1 and 2, image forming apparatus 100 includes an image forming unit 10, a color sensor 19, a controller 20, an operation panel 28, an exposure amount adjusting unit 29, a charging bias applying unit 30, a development bias applying unit 31, and a primary transfer bias applying unit 32. Hereinafter, these components will be described.

Image forming unit 10 employs an electrophotographic method to form, on a sheet S, an image using four colors (yellow, magenta, cyan, and black) of toners. Here, a direction of arrows shown in FIG. 1 represents a conveyance direction (sub-scanning direction) of sheet S, and a direction perpendicular to the conveyance direction (i.e., a direction perpendicular to a plane of sheet) represents a main scanning direction. Sheet S is, for example, an exemplary recording medium, and is constituted of paper, a transparent film, or the like.

As shown in FIG. 1, image forming unit 10 includes charging rollers 11Y, 11M, 11C, 11K, 11W, photoreceptors 12Y, 12M, 12C, 12K, 12W, exposure devices 13Y, 13M, 13C, 13K, 13W, developing rollers 14Y, 14M, 14C, 14K, 14W, primary transfer rollers 15Y, 15M, 15C, 15K, 15W, an intermediate transfer belt 16, a secondary transfer roller 17, and a fixing device 18. Image forming unit 10 can be read as an image forming mechanism.

In image forming unit 10, a component having "K" after its reference numeral is associated with generation of a black toner image. A component having "Y" after its reference numeral is associated with generation of a yellow toner image. A component having "M" after its reference numeral is associated with generation of a magenta toner image. A component having "C" after its reference numeral is associated with generation of a cyan toner image. A component having "W" after its reference number is associated with generation of a white toner image.

Hereinafter, charging rollers 11Y, 11M, 11C, 11K, 11W will be also collectively referred to as "charging roller 11". Photoreceptors 12Y, 12M, 12C, 12K, 12W will be also collectively referred to as "photoreceptor 12". Exposure devices 13Y, 13M, 13C, 13K, 13W will be also collectively referred to as "exposure device 13". Developing rollers 14Y, 14M, 14C, 14K, 14W will be also collectively referred to as "developing roller 14". Primary transfer rollers 15Y, 15M, 15C, 15K, 15W will be also collectively referred to as "primary transfer roller 15".

Each of photoreceptors 12 is uniformly charged by a corresponding charging roller 11. Then, a light beam is emitted from exposure device 13 in accordance with input image data, with the result that an electrostatic latent image corresponding to the image data is formed on the surface of photoreceptor 12. Scanning with the light beam is performed in the main scanning direction.

Developing roller 14 is disposed to face photoreceptor 12. Developing roller 14 adheres, to photoreceptor 12, a toner adhered to its surface, and develops, on photoreceptor 12, a toner image corresponding to the electrostatic latent image. More specifically, electrostatic latent images formed on photoreceptors 12 are developed by receiving supply of yellow (Y), magenta (M), cyan (C), black (K), and white (W) toners by developing rollers 14.

The developed toner images are sequentially transferred onto intermediate transfer belt 16 by primary transfer rollers 15. On this occasion, a primary transfer bias voltage is applied to each of primary transfer rollers 15. Thus, the toner image on photoreceptor 12 is transferred to intermediate transfer belt 16. Intermediate transfer belt 16 functions as an image carrier that carries the toner image. Sheet S is conveyed to secondary transfer roller 17, and the toner images transferred to intermediate transfer belt 16 are collectively transferred onto sheet S by secondary transfer roller 17. Thereafter, the toner images are fixed to sheet S by fixing device 18.

Color sensor 19 serving as a detector detects a color of the image fixed on sheet S.

The above description has described the exemplary configuration of image forming unit 10 in the case where a horizontal tandem type secondary transfer method is employed. However, configurations and arrangement of various elements such as the photoreceptors, the charging devices, the exposure devices, the developing devices, the transfer units, and the fixing unit are not limited to those in the case of FIG. 1, and may be other configurations and arrangements. For example, image forming unit 10 may be of a direct transfer type.

An operation panel 28 shown in FIG. 2 is a user interface through which a user inputs various types of setting values. For example, operation panel 28 includes a plurality of input keys and a touch panel. Operation panel 28 includes an influence coefficient button 281. By operating influence coefficient button 281, an influence coefficient to be used for color correction is calculated. The function of influence coefficient button 281 may be provided in the touch panel. The touch panel is an electronic component in which a display device such as a liquid crystal panel or an organic EL (Electro-Luminescence) panel is combined with a position input device such as a touch pad. Controller 20 receives an instruction from a user or service person through input of an input key or touch input of the touch panel. Controller 20 displays a message to the user on the touch panel.

Exposure amount adjusting unit 29 adjusts a beam light amount of exposure device 13 in accordance with a command from controller 20. Charging bias applying unit 30 applies a charging bias of a designated voltage value to charging roller 11 in accordance with a command from controller 20. Development bias applying unit 31 applies a development bias of a designated voltage value to developing roller 14 in accordance with a command from controller

20. Primary transfer bias applying unit 32 applies a primary transfer bias of a designated voltage value to primary transfer roller 15 in accordance with a command from controller 20.

[Exemplary Configuration of Controller]

As shown in FIG. 2, controller 20 includes, as basic components, a CPU (Central Processing Unit) 21, a communication interface (I/F) unit 22, a ROM (Read Only Memory) 23, and a RAM (Random Access Memory) 24. Controller 20 is an exemplary color correction apparatus. Controller 20 can be read as a processing circuitry.

CPU 21 reads out a program stored in ROM 23 and executes an instruction included in the program. ROM 23 stores programs for controlling operation panel 28, exposure amount adjusting unit 29, charging bias applying unit 30, development bias applying unit 31, primary transfer bias applying unit 32, and the like. Further, ROM 23 stores programs for executing processes shown in various flowcharts described later. RAM 24 is used as a work memory of CPU 21 when a program is executed. Communication I/F unit 22 is an interface for connection to a LAN (Local Area Network), such as a LAN card or a LAN board.

Controller 20 includes an influence coefficient calculation unit 25, an image data storage unit 26, an influence coefficient storage unit 33, a target value storage unit 35, a toner adhesion amount adjusting unit 36, an image forming condition determining unit 37, and an image forming condition storage unit 38.

Among the additional components described above, each of storage units 26, 33, 35, 38 is implemented by a rewritable non-volatile memory such as a flash memory. ROM 23 may be configured as a rewritable non-volatile memory for implementing the above-described storage units. Each of the storage units can be read as a storage (storage device). Each of the other components 36, 37 may be implemented by a microcomputer including a CPU and a memory, may be implemented by an FPGA (Field Programmable Gate Array), or may be implemented by a dedicated circuit such as an ASIC (Application Specific Integrated Circuit). When these functions are implemented by a microcomputer, these functions may be implemented by executing a program by CPU 21.

Influence coefficient calculation unit 25 calculates an influence coefficient in response to an operation on influence coefficient button 281, and stores a calculation result into influence coefficient storage unit 33. Influence coefficient storage unit 33 may store an influence coefficient calculated by a designer in advance. In this case, influence coefficient button 281 may not be provided. Alternatively, the influence coefficient stored in influence coefficient storage unit 33 in advance by the designer may be updated by operating influence coefficient button 281.

Image data storage unit 26 stores patch image data for color correction together with an image forming condition.

Influence coefficient storage unit 33 stores an influence coefficient table to be used for color correction. Target value storage unit 35 stores a target value of a color of an image such as a patch image to be formed on a recording medium. Toner adhesion amount adjusting unit 36 adjusts a toner adhesion amount through image forming condition determining unit 37 so as to obtain a target toner adhesion amount corresponding to the target value.

[Principle of Color Correction]

FIG. 3 is a diagram for illustrating a principle of color correction according to the present embodiment. The three coordinate axes of the graph shown in FIG. 3 respectively correspond to L*, a*, and b* in a CIE Lab color space. With reference to FIG. 3, the following describes the color correction when forming, on sheet S, a multilayer image 70 in which a second image 72 of a second color is superimposed on a portion of a first image 71 of a first color. First image 71 is a foundation image that constitutes a foundation under second image 72. Hence, the first color of first image 71 is a foundation color, and the second color of second image 72 is an upper layer color.

Here, a principle of correcting the first color and the second color will be described by exemplifying white as the first color (foundation color) and exemplifying magenta as the second color (upper layer color). Each of the first color and the second color to be corrected may be one of yellow, magenta, cyan, black, and white toner colors, or may be a color generated by appropriately combining these toner colors.

In FIG. 3, TW represents a target value of the white (W) of the first image (foundation image) 71. TW' represents a current value of the white (W) of first image 71.

In FIG. 3, TM represents a target value of the magenta (M) of second image 72. TM' represents a current value of the magenta (M) of second image 72.

There is a difference between current value TW' and target value TW. In order to make current value TW' coincide with target value TW, it is necessary to correct current value TW' by a change amount corresponding to the difference. When current value TW' is corrected by the correction amount corresponding to the difference, a tone of first image 71 serving as the foundation is changed. However, current value TM' of the magenta (M) of second image 72 is varied due to the change in the tone of first image 71. Therefore, only by simply correcting the difference between current value TW' and target value TW and the difference between current value TM' and target value TM independently, the color of magenta (M) cannot be appropriately corrected.

Therefore, the conventional image forming apparatus performs: a step of correcting the color of white (W) of first image 71 in accordance with a result of measuring the color of white (W) of first image 71; and a step of thereafter correcting the color of magenta (M) in accordance with a result of measuring the color of magenta (M) of second image 72. As a result, in the conventional image forming apparatus, the procedure of the color correction is complicated and the correction cannot be efficiently performed, disadvantageously.

Hence, in image forming apparatus 100 according to the present embodiment, a value of variation of the magenta (M) from current value TM' due to the influence in correcting current value TW' is estimated, and an estimation value EM is corrected by a correction amount corresponding to a difference between estimation value EM and target value TM (difference between the estimation value and the target value).

According to the present embodiment, current value TW' and current value TM' are measured, and then a process of correcting current values TW' and TM' to target values TW and TM can be immediately performed using the measurement results. According to the present embodiment, when forming, on the recording medium, the multilayer image in which the second image of the second color is superimposed on a portion of the first image of the first color, the first color of the lower layer and the second color of the upper layer can be corrected together. Therefore, processing efficiency of the color correction can be improved. Further, according to the present embodiment, both improved productivity and color stability can be achieved.

Conventionally, when printing on a transparent medium, white-applied printing is performed to prevent transmission of light through the printed portion and to improve color production. The white-applied printing is performed in the following manner: a white toner or white ink is applied as a lower layer and a black or color toner is placed thereon.

Since density and tone of the color on the foundation of white formed by the white-applied printing are influenced by a degree of whiteness of the lower layer, the degree of whiteness of the foundation is corrected in advance and then the color of the upper layer is corrected, thereby securing color stability. If the color of the upper layer is corrected after correcting the white of the lower layer, a correction time becomes long to result in decreased productivity.

However, by employing the correction method of the present embodiment, the chromatic color of the upper layer to be varied due to the influence in correcting the white of the lower layer is estimated, and the color of the upper layer is corrected based on the estimation result. Therefore, according to the present embodiment, the lower layer color and the upper layer color can be simultaneously corrected. As a result, a waiting time due to the correction can be reduced, thereby achieving both improved productivity and color stability.

[Patch Image to be Used for Color Correction]

Figure 4:
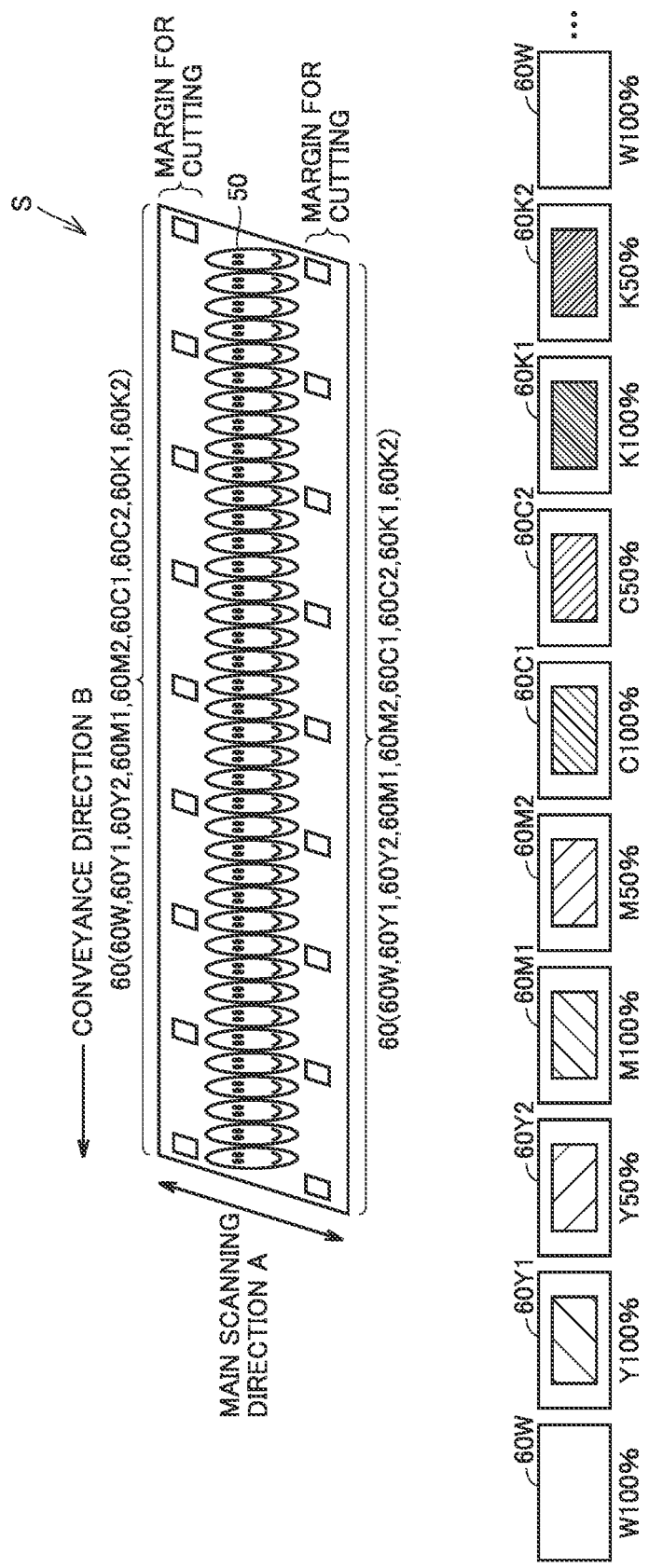
FIG. 4 is a diagram showing an exemplary patch image (adjustment image) formed on a sheet for the color correction.

FIG. 4 is a diagram showing an exemplary patch image (adjustment image) 60 formed on sheet S for the sake of the color correction.

As shown in FIG. 4, in the present embodiment, a plurality of patch images 60 are repeatedly formed at both ends of sheet S in main scanning direction A. Target images 50 intended to be printed are repeatedly formed at the center of sheet S. Each of patch images 60 is detected by color sensor 19.

A patch image 60W, a patch image 60Y1, a patch image 60Y2, a patch image 60M1, a patch image 60M2, a patch image 60C1, a patch image 60C2, a patch image 60K1, and a patch image 60K2 are repeatedly formed on sheet S as patch images 60 along conveyance direction B. Hereinafter, all the types of patch images including patch images 60W, 60Y1, 60Y2, 60M1, 60M2, 60C1, 60C2, 60K1, 60K2 will be collectively referred to as "patch image 60".

Patch image 60W is a 100%-white image, and is generated by a white (W) toner.

Each of the other patch images 60Y1, 60Y2, 60M1, 60M2, 60C1, 60C2, 60K1, 60K2 are generated by superimposing yellow (Y), magenta (M), cyan (C), and black (K) colors of defined gradations on the foundation image having a tint of 100% white and generated by the white (W) toner.

Specifically, patch image 60Y1 is generated by superimposing a 100%-yellow image on the foundation image having a tint of 100% white. Patch image 60Y2 is generated by superimposing a 50%-yellow image on the foundation image having a tint of 100% white. The tint of the foundation in each of patch images 60Y1, Y2 is the same as that of patch image 60W. In other words, the color of patch image 60W is the same as the foundation color under the yellow of each of patch images 60Y1, Y2.

Patch image 60M1 is generated by superimposing a 100%-magenta image on the foundation image having a tint of 100% white. Patch image 60M2 is generated by superimposing a 50%-magenta image on the foundation image having a tint of 100% white. The tint of the foundation in each of patch images 60M1, M2 is the same as that of patch image 60W. In other words, the color of patch image 60W is the same as the foundation color under the magenta of each of patch images 60M1, M2.

Patch image 60C1 is generated by superimposing a 100%-cyan image on the foundation image having a tint of 100% white. Patch image 60C2 is generated by superimposing a 50%-cyan image on the foundation image having a tint of 100% white. The tint of the foundation in each of patch images 60C1, C2 is the same as that of patch image 60W. In other words, the color of patch image 60W is the same as the foundation color under the cyan of each of patch images 60C1, C2.

Patch image 60K1 is generated by superimposing a 100%-black (gradation) image on the foundation image having a tint of 100% white. Patch image 60K2 is generated by superimposing a 50%-black image on the foundation image having a tint of 100% white. The tint of the foundation in each of patch images 60K1, K2 is the same as that of patch image 60W. In other words, the color of patch image 60W is the same as the foundation color under the black of each of patch images 60K1, K2.

Each of patch images 60Y1, 60Y2, 60M1, 60M2, 60C1, 60C2, 60K1, 60K2 is an exemplary multilayer image in the present disclosure. Each of patch images 60Y1, 60Y2, 60M1, 60M2, 60C1, 60C2, 60K1, 60K2 is formed by superimposing a second image of a second color (yellow, magenta, cyan, or black) different from a foundation color on a portion of a first image (foundation image) of a first color (white 100%). Each of yellow, magenta, and cyan of yellow, magenta, cyan, black, and white is a chromatic color, and each of black and white is an achromatic color.

When sheet S having patch image 60 formed thereon is conveyed in conveyance direction B, color sensor 19 detects the white of patch image 60W and detects the color on the foundation color of the white in each of patch images 60Y1, 60Y2, 60M1, 60M2, 60C1, 60C2, 60K1, 60K2. Image forming apparatus 100 uses each of patch images 60 detected by color sensor 19 so as to repeatedly correct the tint such that the color included in patch image 60 becomes close to a target color. Target image 50 is also formed by superimposing a second image on a first image. By making correction such that the color included in patch image 60 becomes close to the target color, the tint of target image 50 is also gradually corrected to an appropriate value.

Here, each of patch images 60Y1, 60Y2, 60M1, 60M2, 60C1, 60C2, 60K1, 60K2 has been described as an exemplary multilayer image in which a second image of a second color is superimposed on a portion of a first image of a first color. In this case, the first color is white and the second color is one of yellow (100% or 50%), magenta (100% or 50%), cyan (100% or 50%), and black (100% or 50%). However, the multilayer image is not limited to each of these patch images 60Y1, 60Y2, 60M1, 60M2, 60C1, 60C2, 60K1, 60K2.

For example, any type of chromatic color or achromatic color may be employed as the first color. In this case, any color different from the first color may be employed as the second color. Moreover, a portion of the second image superimposed on the first image may extend to an end of the first image.

Controller 20 may create a patch image having desired color and gradation value at desired position and timing in accordance with a type of the sensor that detects the color and in accordance with a content of correction. When a correction amount is calculated by detecting the color on sheet S, controller 20 may form a patch image on paper at an end region not to be used by the user. Alternatively, controller 20 may print one page, as a correction page including the patch image, separately from the material output by the user, and may eject the correction page to another tray.

When performing gradation correction or performing correction to correct a 3D-LUT, the color/gradation value of patch image 60 become a gradation value pattern of Y, M, C, K, R, G, B, Pbk. When correcting only a maximum density portion of density portions caused by a developing voltage for each color or the like, patch image 60 may be formed by a pattern of only a 100%-gradation portion of a single color of Y, M, C, and K. A region in which patch image 60 for correction and the pattern for consumption can be formed is located outside the region in which the user image is to be formed. For this reason, when consuming a toner to suppress deterioration of the toner, the following constraint is resulted: frequency of a toner consumption pattern for maintaining image quality is prioritized, and frequency of generating patch image 60 for correction is restricted. It should be noted that patch image 60 may be also used for correction other than the toner consumption.

[Procedure of Color Correction Process]

Figure 5:
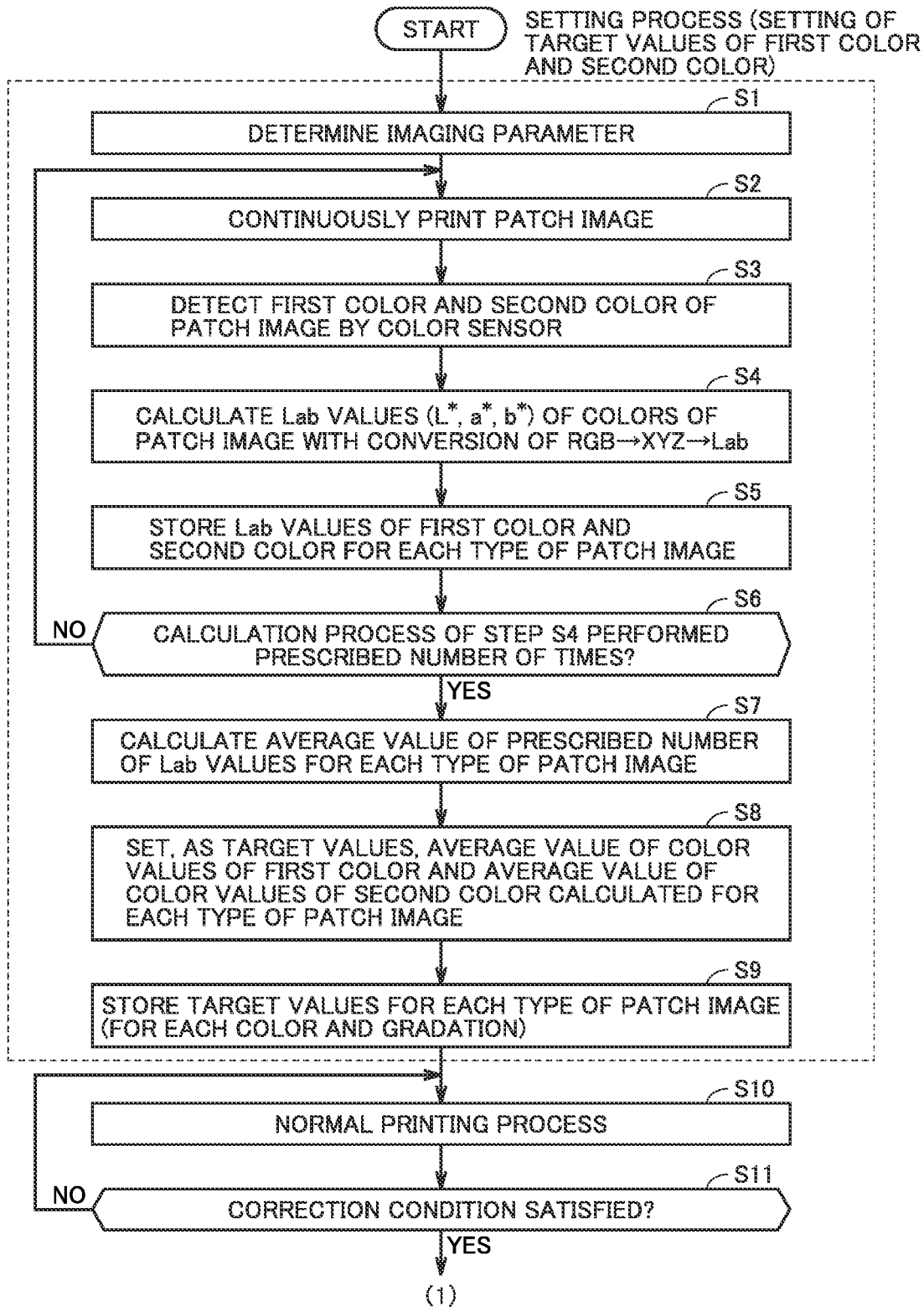
FIG. 5 is a flowchart for illustrating a procedure of a color correction process.
Figure 6:
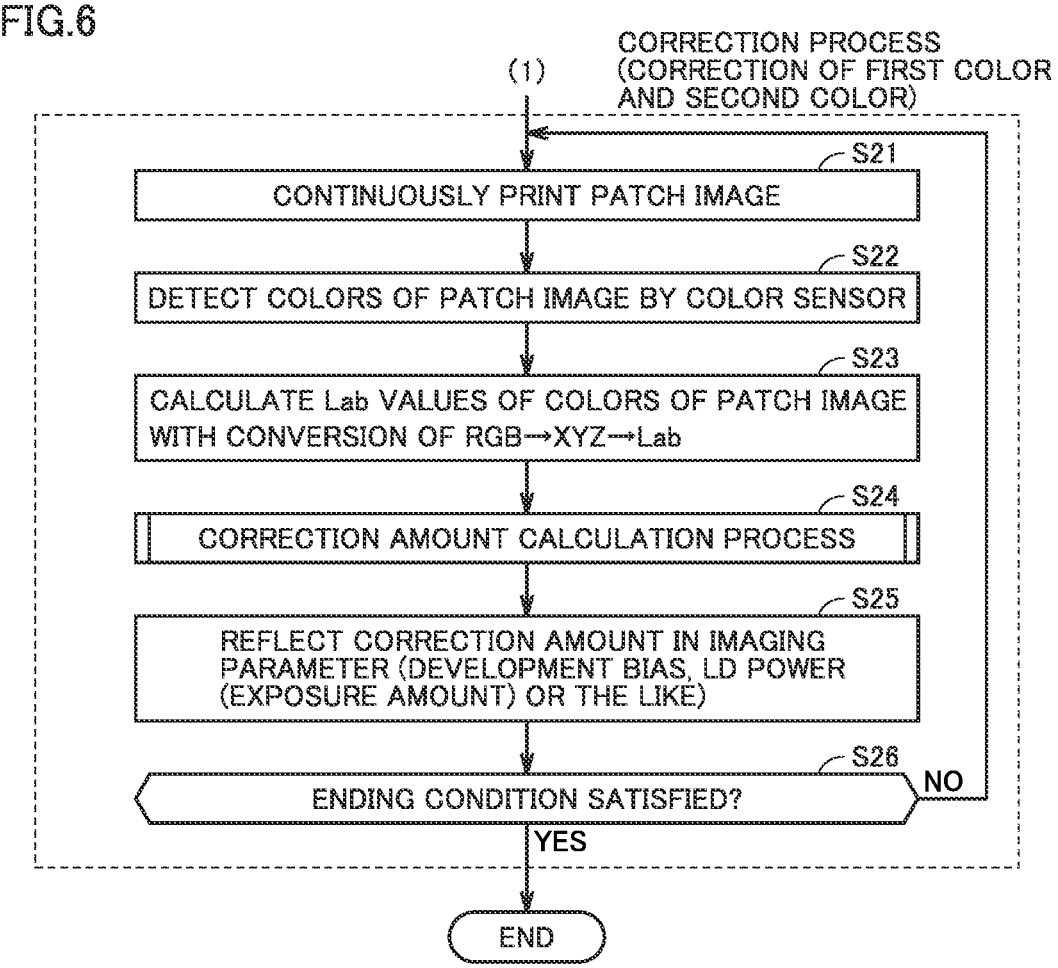
FIG. 6 is a flowchart for illustrating a procedure of the color correction process.

Each of FIGS. 5 and 6 is a flowchart for illustrating a procedure of the color correction process. Here, the following describes a procedure of controller 20 performing the color correction process using patch image 60 shown in FIG. 4.

In the color correction process, the first color and the second color are efficiently corrected in the multilayer image in which the second image of the second color is superimposed on the portion of the first image of the first color. As shown in FIGS. 5 and 6, the color correction process includes: a process of setting target values of the first color and the second color (steps S1 to S9); and a process of correcting the first color and the second color using the set target values (steps S21 to S26).

First, the process of setting the target values of the first color and the second color will be described with reference to FIG. 5. Combinations of the first color of the lower layer image (first image) and the second color of the upper layer image (second image) can be set in various manners. Here, for example, combinations of the first and second colors in the plurality of types of patch images 60 shown in FIG. 4 are assumed.

First, controller 20 determines an imaging parameter about the target values of the first color and the second color (step S1). Next, controller 20 continuously prints patch image 60 on sheet S as shown in FIG. 4 in accordance with the determined imaging parameter (step S2). Thus, a step of forming, on the recording medium, the multilayer image in which the second image of the second color is superimposed on the portion of the first image of the first color is performed.

Next, controller 20 uses color sensor 19 to detect the first color of the foundation image (first image) and the second color of the upper layer image (second image) of each of various patch images 60 (step S3). For example, in the case of patch image 60Y1, the color of 100%-white is detected as the first color, and the color of 100%-yellow is detected as the second color. Similarly, in the case of patch image 60M2, the color of 100%-white is detected as the first color, and the color of 50%-magenta is detected as the second color. It should be noted that the color of 100%-white, which is the foundation color, is detected from patch image 60W. Controller 20 obtains the first color and the second color from color sensor 19 for each type of patch image 60.

Next, controller 20 performs a process of converting a value of the chromaticity coordinates (color value coordinates) (RGB→XYZ→Lab) so as to calculate Lab values (L*, a*, b*) of the colors (the first color and the second color) of the patch image (step S4). In this way, controller 20 specifies the values of the first color and the second color by the values of the Lab color system of the color coordinates.

Next, controller 20 stores the color values (Lab values) of the first color and the second color into target value storage unit 35 (see FIG. 2) for each type of patch image 60 (step S5).

Controller 20 may employ the color values of the first color and the second color stored herein as the target values. However, controller 20 according to the present embodiment sets each of the target values using an average value of a plurality of calculation results. Therefore, controller 20 determines whether or not the calculation process of step S4 has been performed a prescribed number of times (step S6). The prescribed number is, for example, 3. It should be noted that the prescribed number may be any number that is equal to or more than 2.

When the calculation process of step S4 has not been performed the prescribed number of times, controller 20 returns to step S2, and repeats the processes after the process of printing patch image 60. When the calculation process of step S4 has been performed the prescribed number of times, controller 20 calculates an average value of the prescribed number of Lab values for each type of patch image 60 (step S7). Thus, the average value of the color values of the first color and the average value of the color values of the second color are calculated for each type of patch image 60.

Next, controller 20 sets, as the target values (the target value of the first color and the target value of the second color), the average value of the color values of the first color and the average value of the color values of the second color calculated for each type of patch image 60 (step S8). Next, controller 20 stores the target value of the first color and the target value of the second color into target value storage unit 35 for each type of patch image 60 (step S9).

With step S9, the process of setting the target value of the first color and the target value of the second color is ended. Next, controller 20 performs a normal printing process (step S10). Thus, for example, target image 50 shown in FIG. 4 is printed on sheet S. On this occasion, patch image 60 is not printed on sheet S. Target image 50 is a multilayer image including a first color and a second color. For example, target image 50 may be constituted of: a first image constituted of a white-applied printing layer; and a second image formed on the white-applied printing layer.

Next, controller 20 determines whether or not a correction condition is satisfied (step S11). For example, controller 20 may determine that the correction condition is satisfied when the number of printed sheets in the normal printing process (step S10) reaches a prescribed number (for example, 10 sheets). Controller 20 may determine that the correction condition is satisfied when a printing time in the normal printing process (step S10) reaches a prescribed time.

Controller 20 repeatedly performs the normal printing process until the correction condition is satisfied. When it is determined that the correction condition is satisfied, controller 20 performs a process of correcting the first color and the second color of the multilayer image using the set target values.

Next, the process of correcting the first color and the second color of the multilayer image using the set target values will be described. Referring to FIG. 6, in steps S21 to S23, controller 20 performs the following processes in the same flow as that for steps S2 to S4: a process of printing patch image 60; a process of detecting the first color and second color of patch image 60; and a process of calculating a Lab value of the first color (first color value of the first color) and a Lab value of the second color (second color value of the second color). With step S21, the step of forming, on the recording medium, the multilayer image in which the second image of the second color is superimposed on the portion of the first image of the first color is performed.

Next, controller 20 corrects the Lab value of the first color and the Lab value of the second color calculated in step S23 to appropriate values. For this purpose, controller 20 performs a correction amount calculation process (step S24) to calculate a correction amount. An example of the correction amount calculation process will be described later in detail with reference to FIG. 7. Then, the calculated correction amount is reflected in the imaging parameter (step S25). The imaging parameter in which the correction amount is reflected may be, for example, any of a development bias value (Vdc) for the first color or the second color, an exposure amount (beam light amount of exposure device 13), and the like. Thus, the imaging parameter is corrected to an appropriate value. In this way, controller 20 corrects the first color and the second color by changing the imaging parameter.

Next, controller 20 determines whether or not an ending condition is satisfied (step S26). For example, when controller 20 determines that the process of step S25 has been performed a prescribed number of times, controller 20 determines that the ending condition is satisfied. The prescribed number of times is 1 or more. Controller 20 may accept a prescribed number of input operations by the user.

When the ending condition is not satisfied, the process returns to step S21, and the processes of step S21 and the subsequent steps are repeated. Thus, patch image 60 is repeatedly printed on sheet S, and the process of correcting the first color and the second color is repeated.

When it is determined that the ending condition is satisfied, controller 20 ends the process that is based on the flowchart. It should be noted that when it is determined that the ending condition is satisfied, the controller may transition to the normal printing process of step S10.

[Procedure of Correction Amount Calculation Process]

Figure 7:
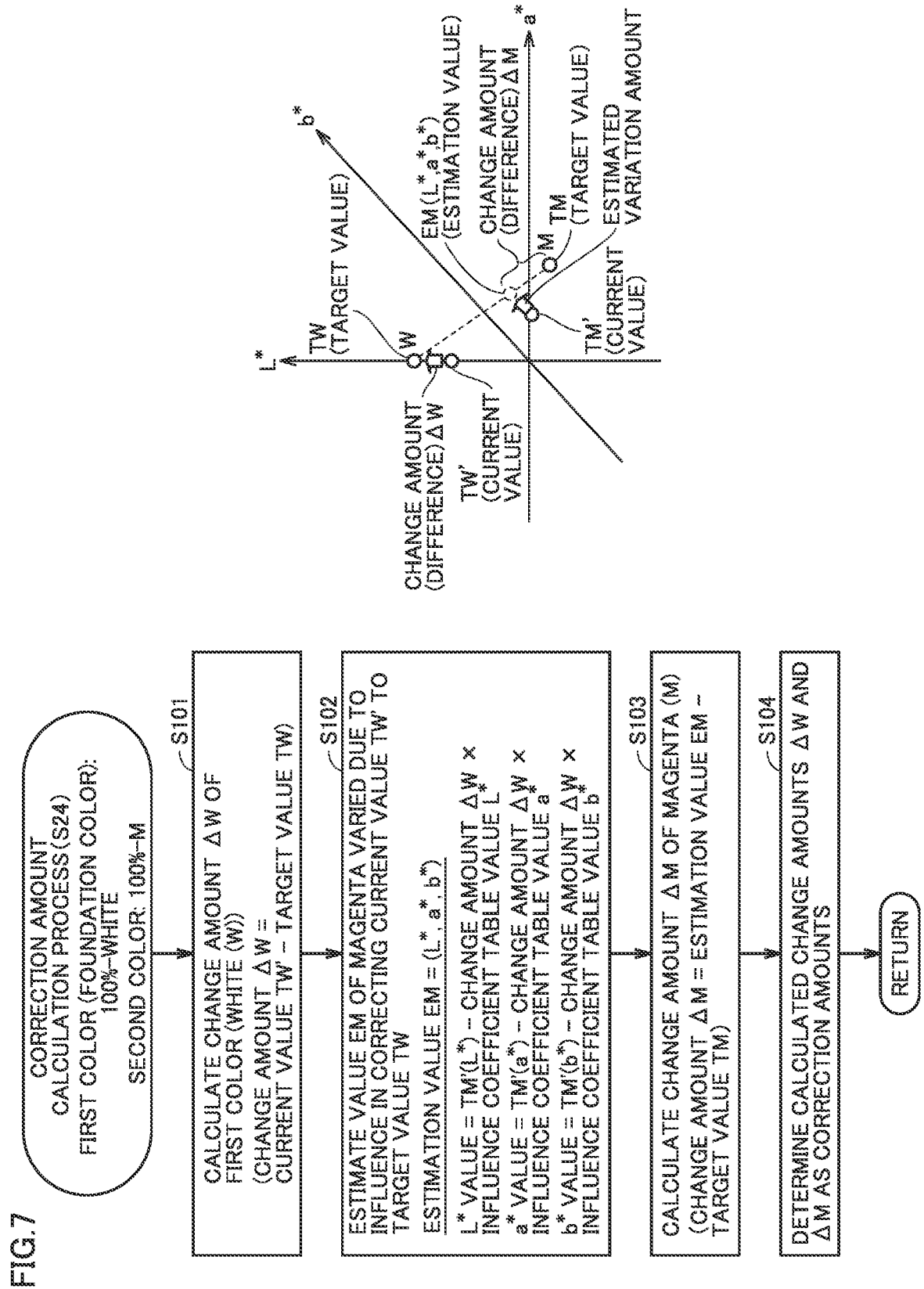
FIG. 7 shows a subroutine representing an exemplary correction amount calculation process.

FIG. 7 shows a subroutine representing an exemplary correction amount calculation process. Controller 20 executes this subroutine in step S24 of FIG. 6. Here, the correction amount calculation process will be described by exemplifying a case where the first color is 100%-white and the second color is 100%-magenta (M) among the multiplicity of combinations of the first and second colors. In other words, here, the correction amount calculation process will be described by exemplifying a case where the first color is an achromatic color and the second color is a chromatic color.

First, controller 20 calculates a change amount (difference) ΔW of the white (W) that is the first color (step S101). Change amount ΔW is calculated by "ΔW=current value TW'−target value TW".

Next, controller 20 estimates a value EM of the magenta (M) to be varied due to an influence in correcting current value TW' of the white (W) to target value TW (step S102). Here, controller 20 calculates estimation value EM=(L*, a*, b*) in accordance with a calculation formula shown in FIG. 7 using current value TM' of the magenta (M), change amount ΔW of the white (W), and an influence coefficient table value.

That is, the "L* value" is calculated by "L* value=TM' (L*)−change amount ΔW×influence coefficient table value L*". The "a* value" is calculated by "a* value=TM'(a*)− change amount ΔW×influence coefficient table value a*". The "b* value" is calculated by "b* value=TM'(b*)−change amount ΔW×influence coefficient table value b*".

In this way, controller 20 calculates estimation value EM of the second color (magenta) based on difference ΔW between current value TW' of the first color (white) (the first color value of the first color) detected by color sensor 19 and target value TW of the first color (white) as well as current value TM' of the second color (magenta) (the second color value of the second color) detected by color sensor 19.

Since the absolute value of the color is changed depending on the recording medium, the colorimetric background, the amount of adhesion of white, and the like, a relative ratio of change from the difference between the color of the surface of the recording medium (or the white portion) and the target value is found to specify variation of development of each color. Change amount ΔW for correcting the white (W) influences the Lab value of the magenta (M) on the white (W) image serving as the foundation. Therefore, in the present embodiment, estimation value EM is calculated by removing, from TW', an influence amount provided by change amount ΔW.

Here, the influence coefficient table value will be described with reference to FIG. 8. FIG. 8 is a diagram showing influence coefficient tables stored in the influence coefficient storage unit. Influence coefficient storage unit 33 of image forming apparatus 100 stores the influence coefficient tables. Each of the influence coefficient table includes influence coefficient table values of (L*, a*, b*) corresponding to yellow (Y), magenta (M), cyan (C), and black (K). In particular, in the influence coefficient table shown in FIG. 8, influence coefficient table values are defined for gradations of the second color (Y, M, C, K). An influence on the first color, which is the foundation color, differs depending on a gradation of the second color. Therefore, in the present embodiment, the coefficient is made different for each gradation, thereby reducing deviation in correction.

It should be noted that since the influence coefficient differs depending on a type of sheet (paper type), the influence coefficient table value desirably differs depending on the type of sheet (paper type). In this case, as shown in FIG. 8, the influence coefficient tables for the respective types of sheets are desirably stored in influence coefficient storage unit 33. Thus, controller 20 can calculate the estimation value of the second color in accordance with a pattern that differs depending on the type of the recording medium (sheet).

Controller 20 calculates estimation value EM of the second color (magenta) using the influence coefficient table.

Hereinafter, the "influence coefficient table value" may also be referred to as "influence coefficient". In step S102 of FIG. 7, controller 20 makes reference to the influence coefficient table stored in influence coefficient storage unit 33 so as to obtain an appropriate influence coefficient. For example, when the second color is 100%—magenta (M), controller 20 obtains (0.27, 1.36, 0.31) from the influence coefficient table as the influence coefficient of (L*, a*, b*).

If the second color is 50%-magenta (M), controller 20 obtains (0.83, 0.22, 0.18) from the influence coefficient table as the influence coefficient of (L*, a*, b*). In this way, controller 20 calculates the estimation value of the second color in accordance with a pattern that differs depending on the gradation of the second color.

If the second color is 100%-yellow (Y), controller 20 obtains (0.39, 0.18, 1.78) from the influence coefficient table as the influence coefficient of (L*, a*, b*). In this way, controller 20 calculates the estimation value of the second color in accordance with the pattern that differs depending on the toner color that forms the second color.

Further, from tables A, B, C . . . , controller 20 selects an influence coefficient table to which reference is to be made, in accordance with a type of sheet (for example, paper quality). In each of tables A, B, and C, an influence coefficient value that differs depending on a type of sheet (paper quality) is defined for each gradation and each toner color. Hence, controller 20 calculates estimation value EM of the second color in accordance with a pattern that differs depending on the type of the recording medium. Examples of the type of sheet include a transparent film, paper, and the like.

After calculating estimation value EM in step S102, controller 20 calculates change amount (difference) ΔM of the magenta (M) (step S103). Here, change amount ΔM of the magenta (M) is calculated by "change amount ΔM=estimation value EM−target value TM".

Next, controller 20 determines calculated change amounts ΔW and ΔM as correction amounts (step S104), and returns to step S24 of FIG. 6. As a result, in step S25 of FIG. 6, each of correction amounts ΔW and ΔM is reflected in the imaging parameter. That is, controller 20 corrects the first color (white) based on difference ΔW between current value TW' of the first color (white) detected by color sensor 19 and target value TW of the first color (white), and corrects the second color (magenta) based on difference ΔM between estimation value EM of the second color (magenta) and target value TM of the second color (magenta).

By performing the correction amount calculation process described above, a value of variation of the magenta (M) from current value TM' due to the influence in correcting current value TW' of the white (W) is estimated, and estimation value EM is corrected by change amount ΔM corresponding to the difference between estimation value EM and target value TM. That is, controller 20 estimates the value of the second color (magenta) to be varied due to the influence of the correction of the first color (white), and corrects the second color (magenta) based on estimation value EM of the second color and current value TM' of the second color (magenta) detected by color sensor 19.

According to the present embodiment, after detecting the color values of current value TW' and current value TM', the process of correcting current values TW' and TM' to target values TW, TM can be immediately performed using the detection results thereof.

It should be noted that here, the correction amount calculation process has been described by exemplifying the case where the first color is 100%-white and the second color is 100%-magenta (M) among the multiplicity of combinations of the first and second colors. However, the correction amount calculation process shown in FIG. 7 can also be applied to the other combinations of the first and second colors.

[Method of Calculating Influence Coefficient]

FIG. 9 is a diagram for illustrating data obtained to calculate the influence coefficient. The influence coefficient is found by calculating a ratio of change in the color value of the upper layer color with respect to a change in the "change amount of the value of the foundation color". For example, the following assumes a case where white is employed as the foundation color and any one of yellow (Y), magenta (M), cyan (C), and black (K) is employed as the upper layer color.

In this case, the ratio of change in the color value of the yellow (Y) with respect to the change amount of the color value of the white is calculated, thereby finding the influence coefficient of the yellow (Y) when the white is employed as the foundation color and the yellow (Y) is employed as the upper layer color. By applying the same calculation method to each of the magenta (M), the cyan (C), and the black (K), influence coefficients of the magenta (M), the cyan (C), and the black (K) are found.

In order to find the influence coefficient of each of the yellow (Y), the magenta (M), the cyan (C), and the black (K), it is necessary to obtain the Lab value of the upper layer color (yellow (Y), magenta (M), cyan (C), and black (K)) when the amount of adhesion of L* of the white serving as the foundation color (amount of adhesion of the white toner) is made different. To address this, as shown in FIG. 9, the amount of adhesion of the foundation color is changed to a plurality of levels without changing the amount of adhesion of the toner of the upper layer color (yellow (Y), magenta (M), cyan (C), and black (K)), and the Lab value (L*, a*, b*) of the upper layer color at each level is measured using color sensor 19 or the like.

Figure 10:
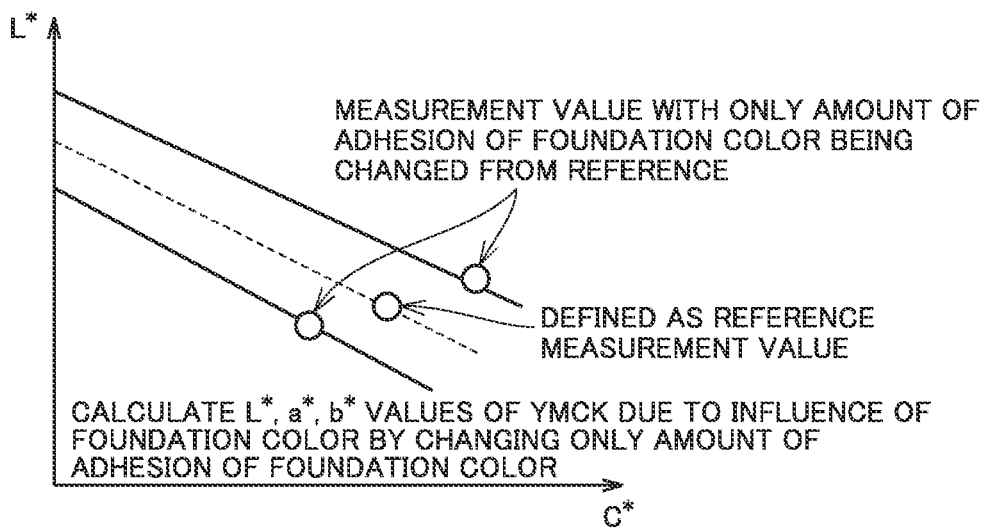
FIG. 10 is a conceptual diagram of graphs for illustrating a method of calculating the influence coefficient.

FIG. 10 is a conceptual diagram of graphs for illustrating the method of calculating the influence coefficient. Each of the graphs corresponds to any of the four upper layer colors (yellow (Y), magenta (M), cyan (C), and black (K)). By changing the amount of adhesion (L*) of the foundation color, the color value (indicated by a color saturation C* in FIG. 10) of the upper layer color is changed. One of variously changed amounts of adhesion (L*) of the foundation color is used as a reference measurement value to specify the ratio of change in the color value of the upper layer color with respect to the change in the "change amount of the value of the foundation color".

The table of FIG. 9 illustratively shows that the Lab value of the upper layer color (yellow (Y), magenta (M), cyan (C), and black (K)) is obtained with the amount of adhesion of L* of the white being made different to the four levels, i.e., amounts 1 to 4. In the table, the b* value of the cyan (C) is shown as an exemplary obtained Lab value.

In the table of FIG. 9, the "white L* change amount" is calculated based on any one of amounts 1 to 4 as a reference, each of amounts 1 to 4 being the amount of adhesion of L* of the white (the amount of adhesion of the white toner). The table shows a "white L* change amount" when amount 3 is employed as the reference (reference amount of adhesion of the foundation color). The "white L* change amount" corresponding to the row of "amount 1" is calculated by "amount 1−amount 3". The "white L* change amount" corresponding to the row of "amount 2" is calculated by "amount 1−amount 2". The "white L* change amount" corresponding to the row of "amount 4" is calculated by "amount 1−amount 4".

According to the table of FIG. 9, the b* value of the cyan (C) with respect to the "white L* change amount=7.4" is −41, the b* value of the cyan (C) with respect to "white L* change amount=5.2" is −40, the b* value of cyan (C) with respect to the "white L* change amount=0" is −37, and the b* value of the cyan (C) with respect to the "white L* change amount=−5.5" is −31.

When the "white L* change amount" is represented on the horizontal axis of the coordinate system and the "b* value of the cyan (C)" is represented on the vertical axis of the coordinate system, (the white L* change amount, the b* value of the cyan) shown in the table of FIG. 9 can be expressed as (7.4, −41), (5.2, −40), (0, 37), and (−5.5, −31). A graph created based on these values is shown in FIG. 11.

Figure 11:
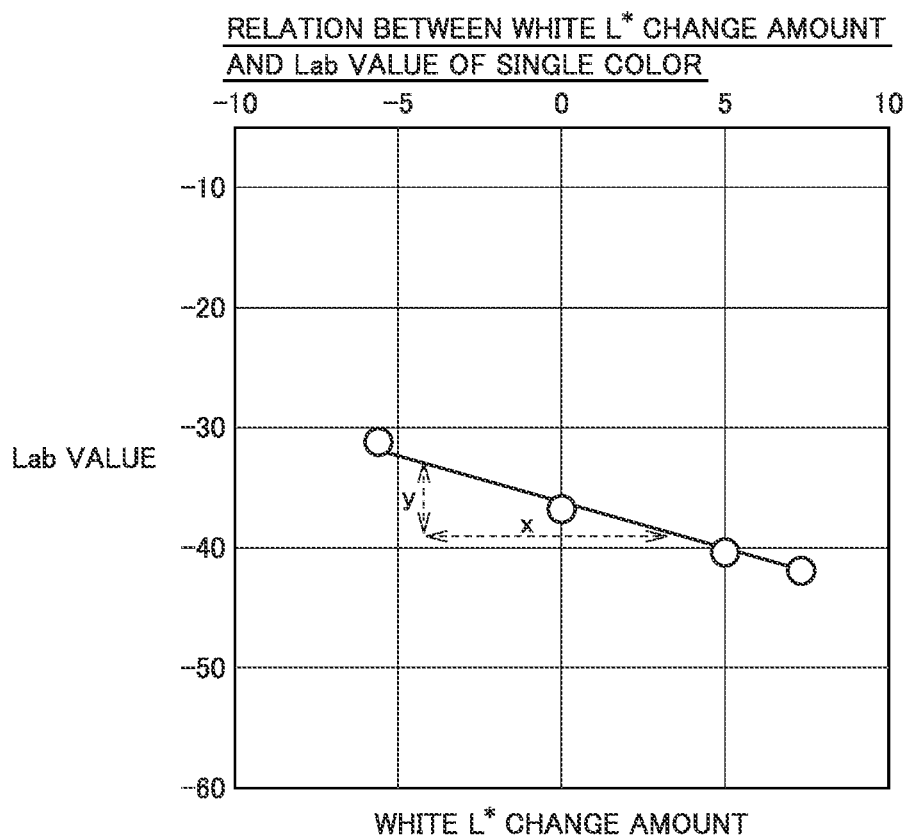
FIG. 11 is an exemplary graph showing a relation between a change amount of a value of a foundation color and a Lab value of an upper layer color.

FIG. 11 is an exemplary graph showing a relation between the change amount of the value of the foundation color and the Lab value of the upper layer color. In particular, FIG. 11 shows a relation between the "white L* change amount" shown in the table of FIG. 9 and the Lab value (b*) of the cyan (C). The graph shown in FIG. 11 is created by plotting (the white L* change amount, the b* value of the cyan) on the coordinates shown in FIG. 11 and drawing a linear straight line representing a relation between the plotted values. By calculating a slope "y/x" of the graph, the influence coefficient of the Lab value (b*) of the cyan (C) when the foundation color is white can be found.

In the same procedure, a relation between the "white L* change amount" and the Lab value (L*) of the cyan (C) can be represented in the form of a graph. From the graph, the influence coefficient of the Lab value (L*) of the cyan (C) when the foundation color is white can be found.

In the same procedure, a relation between the "white L* change amount" and the Lab value (a*) of the cyan (C) can be represented in the form of a graph. From the graph, the influence coefficient of the Lab value (a*) of the cyan (C) when the foundation color is white can be found.

In FIGS. 9 and 11, the procedure of calculating the influence coefficient has been described with the cyan (C) being shown as an exemplary upper layer color. However, also when each of the other colors such as yellow (Y), magenta (M), and black (K) is used as the upper layer color, the influence coefficient corresponding to the Lab value (L*, a*, b*) of each of the colors can be found in the same procedure. Further, by applying the same procedure to each of foundation colors other than white, the influence coefficient can be calculated for each foundation color.

Figure 12:
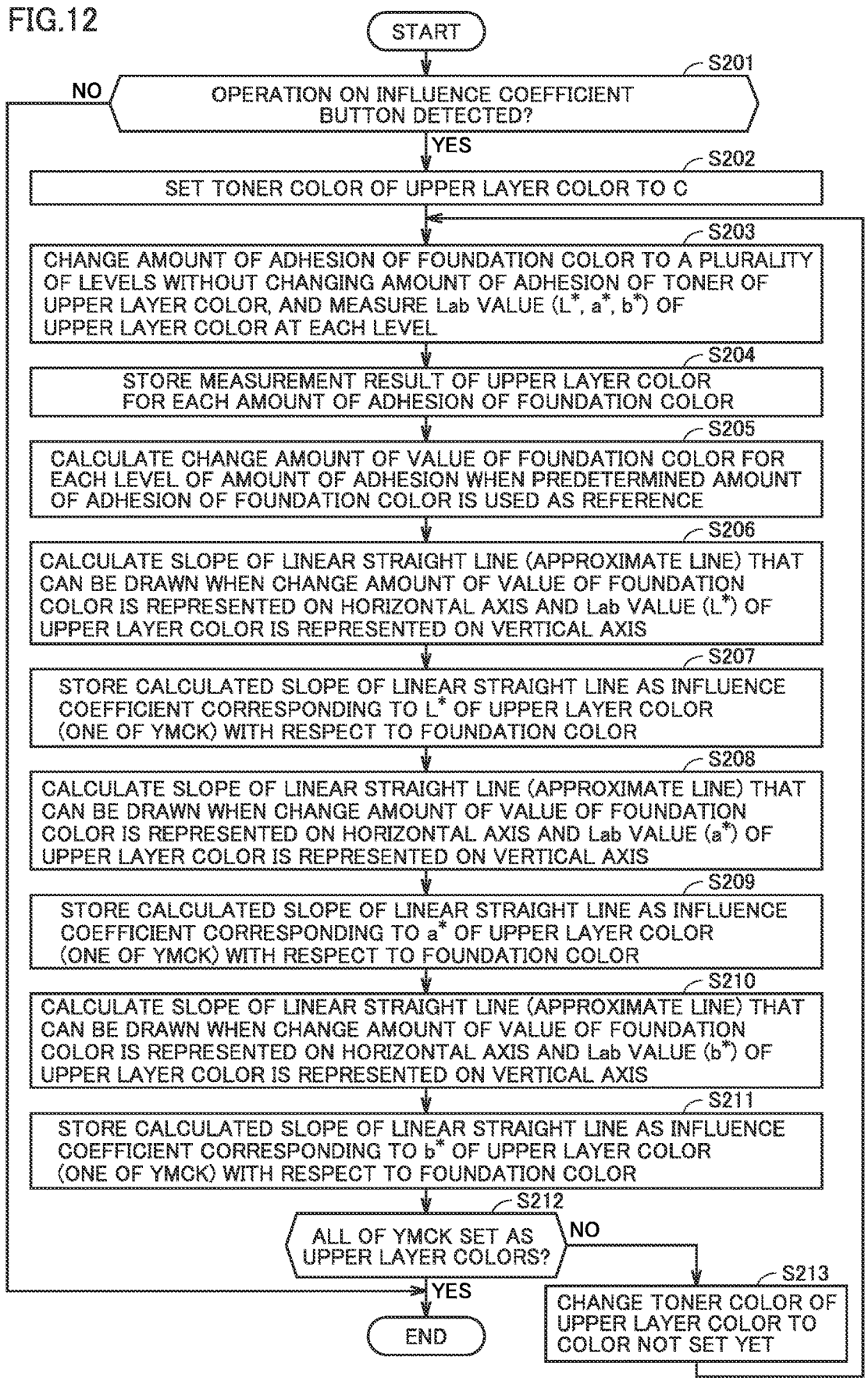
FIG. 12 is a flowchart for illustrating a procedure of calculating the influence coefficient.

FIG. 12 is a flowchart for illustrating a procedure of calculating the influence coefficient. Here, the following describes a procedure of controller 20 calculating the influence coefficient based on an operation on influence coefficient button 281. It should be noted that it is illustratively described here that the foundation color is white and the upper layer color is any of yellow (Y), magenta (M), cyan (C), and black (K).

First, controller 20 determines whether or not an operation on influence coefficient button 281 is detected (step S201). When the operation on influence coefficient button 281 is not detected, controller 20 ends the process that is based on this flowchart. When the operation on influence coefficient button 281 is detected, controller 20 sets the toner color of the upper layer color to cyan (C) (step S202).

Next, controller 20 changes the amount of adhesion of the foundation color to a plurality of levels without changing the amount of adhesion of the toner of the upper layer color, and measures the Lab value (L*, a*, b*) of the upper layer color at each level (step S203). For example, controller 20 proceeds the process of step S203 by using patch images 60 corresponding to the cyan (C) among patch images 60 shown in FIG. 4. More specifically, a plurality of patch images 60 of the cyan (C) generated by changing the amount of adhesion of the toner of the foundation color are printed, and the color values of the foundation color and the upper layer color of each of patch images 60 are measured by color sensor 19.

Next, controller 20 stores a measurement result of the upper layer color into a storage area for each amount of adhesion of the foundation color (step S204). As the storage area, for example, a part of the area of influence coefficient storage unit 33 may be used. Thus, the color value of the cyan (C) in the table shown in FIG. 9 is stored in the storage area, for example.

Next, controller 20 calculates the change amount of the value of the foundation color for each level of the amount of adhesion when a predetermined amount of adhesion of the foundation color is used as a reference (step S205). Thus, for example, the "white L* change amount" in the table shown in FIG. 9 is calculated. Controller 20 may store the calculation result into a part of the area of influence coefficient storage unit 33.

Next, controller 20 calculates a slope of a linear straight line (approximate line) that can be drawn when the change amount of the value of the foundation color is represented on the horizontal axis and the Lab value (L*) of the upper layer color is represented on the vertical axis (step S206). In step S206, controller 20 does not perform a process of actually drawing the linear straight line. Controller 20 calculates the slope of the linear straight line in accordance with each value of (the white L* change amount, L* of the cyan) in the table of FIG. 9.

Next, controller 20 stores the calculated slope of the linear straight line into influence coefficient storage unit 33 as the influence coefficient of L* of the upper layer color with respect to the foundation color (step S207). For example, when the cyan (C) is set in step S202, influence coefficient storage unit 33 stores the influence coefficient of L* of the cyan (C).

Thereafter, also in steps S208 and S209, the influence coefficient of a* of the upper layer color is stored into influence coefficient storage unit 33 in the same procedure, and also in steps S210 and S211, the influence coefficient of b* of the upper layer color is stored into influence coefficient storage unit 33 in the same procedure. Hereinafter, each of the steps will be described.

Controller 20 calculates a slope of a linear straight line (approximate line) that can be drawn when the change amount of the value of the foundation color is represented on the horizontal axis and the Lab value (a*) of the upper layer color is represented on the vertical axis (step S208). Next, controller 20 stores the calculated slope of the linear straight line into influence coefficient storage unit 33 as the influence coefficient of a* of the upper layer color with respect to the foundation color (step S209).

Next, controller 20 calculates a slope of a linear straight line (approximate line) that can be drawn when the change amount of the value of the foundation color is represented on the horizontal axis and the Lab value (b*) of the upper layer color is represented on the vertical axis (step S210). Thus, for example, "y/x" shown in FIG. 11 is calculated. Next, controller 20 stores the calculated slope of the linear straight line into influence coefficient storage unit 33 as the influence coefficient of b* of the upper layer color with respect to the foundation color (step S211).

Next, controller 20 determines whether or not all of yellow (Y), magenta (M), cyan (C), and black (K) have been set as the upper layer colors (step S211). In other words, controller 20 determines whether or not all the influence coefficients of yellow (Y), magenta (M), cyan (C), and black (K) have been calculated.

When all of yellow (Y), magenta (M), cyan (C), and black (K) have not been set as the upper layer colors, controller 20 changes the toner color of the upper layer color to a color (one of yellow (Y), magenta (M), cyan (C), and black (K)) that has not been set yet (step S213). Then, controller 20 returns to step S203, and repeats the processes of steps S203 to S212 based on the newly set upper layer color.

When controller 20 determines that all of yellow (Y), magenta (M), cyan (C), and black (K) have been set as the upper layer colors (YES in step S212), controller 20 ends all the processes that are based on this flowchart.

[Modifications]

Next, modifications will be described. When continuously performing printing on sheet S (continuous printing), the user compares a color of a test print before starting the printing or an initial color at the start of the printing with a print sample or the like so as to adjust the color or recognize a variation of the color. Therefore, also in the color correction during the printing, the color of the patch image at the same timing as the timing of the adjustment of the color or the recognition of the variation of the color is desirably set as the target value. Specifically, the target value may be set to be the same as a target value in a color adjustment performed in advance, or the initial color of the patch image at the start of the printing may be set as the target value.

In the present embodiment, the target value set in advance and colors of patch images sequentially created during the printing after setting the target value are measured to calculate a correction amount in accordance with a comparison in color therebetween. As a correction method, for example, it is conceived to decrease a developing potential by 10% when a density value is increased by 10% with respect to the target value. Alternatively, it is conceived to perform the correction using various types of correction methods, for example, by correcting a y curve or a 3D-LUT so as to make a gradation curve coincide with the target value.

In the present embodiment, white is exemplified as the first color (foundation color), and each of Y, M, C, and K is exemplified as the second color (upper layer color). However, the scope of application of the present disclosure is not limited thereto. For example, the first color or the second color may be constituted of a multi-order color generated by two or more types of toner colors. Further, the recording medium applicable to the present disclosure is not limited to paper. A colored transparent film or a colorless transparent film may be used as the recording medium. Moreover, the recording medium may be continuous paper or roll paper.

In the present embodiment, patch image 60 formed at the end portion of the recording medium is exemplified as the multilayer image, and the first color and the second color are detected from patch image 60. However, when target image 50 shown in FIG. 4 is constituted of such a multilayer image, the first color and the second color may be detected from target image 50.

In the present embodiment, it has been illustratively described that two types of gradations (100% and 50%) of each of Y, M, C, and K are combined as a type of color defined in the influence coefficient table. However, the type of color defined in the influence coefficient table is not limited thereto. Another toner color may be further employed, and three or more types of gradations of each toner color may be combined.

As shown in FIG. 4, each of patch images 60, except for white patch image 60W, is formed by superimposing the upper layer color on the foundation color (white). A position for detection by color sensor 19 may be repeatedly moved in main scanning direction A in order to detect both the foundation color and the upper layer color from patch image 60 formed by superimposing the upper layer color on the foundation color (white). Thus, color sensor 19 can detect both the foundation color and the upper layer color from one patch image 60. Both the foundation color and the upper layer color may be detected from one patch image 60 by two color sensors 19 including a first sensor disposed at a position for the upper layer color of patch image 60 and a second sensor disposed at a position for the foundation color of patch image 60. In the present embodiment, controller 20 is an exemplary color correction apparatus. A computer connected to controller 20 may perform the various types of processes of controller 20 described with reference to FIGS. 5 to 12. In this case, the computer transmits a result of the performed process to controller 20, and controller 20 performs the color correction or the like in accordance with the result of the process. With such a configuration, the computer is another exemplary color correction apparatus.

[Program]

A program for causing controller 20 to perform the above-described process is stored in ROM 23 of controller 20. Such a program includes at least a program according to the flowcharts described above. The program may be provided as a program product with the program being recorded on a computer readable recording medium such as a flexible disk, a CD-ROM (Compact Disk Read Only Memory), or a memory card, which are attached to controller 20. Alternatively, the program may be provided with the program being recorded on a recording medium such as a hard disk included in a computer. The program can also be provided by downloading via a network. The program may be executed by one or more processors such as a CPU, or by a combination of a processor and a circuitry such as an ASIC or FPGA.

It should be noted that the program may cause a processor to execute a process by invoking, in a predetermined sequence at a predetermined timing, necessary modules of program modules provided as a part of an OS (Operating System) of the computer. In this case, the program itself does not include the above modules, and the process is performed in cooperation with the OS. Such a program that does not include the modules may also be included in the program of the present embodiment.

Further, the program according to the present embodiment may be provided with the program being incorporated in a part of another program. Also in this case, the program itself does not include modules included in the other program, and causes the processor to perform the process in cooperation with the other program. Such a program incorporated in the other program may also be included in the program according to the present embodiment.

[Aspects]

Aspects of the present disclosure will be listed below.

(Item 1) A color correction apparatus (20) according to item 1 comprising: an obtaining unit (step S22) that obtains first color information of a first image formed by a first color formed on a recording medium and second color information of a second image of a second color superimposed on the first color formed on the recording medium; and a correction unit (step S24 (step S25)) that finds a correction value for the second color by estimating color information of the second color based on the first color information and the second color information, the color information of the second color being varied due to an influence in correcting the first color information to a first target value of the first color.

(Item 2) The color correction apparatus according to item 1, wherein the correction unit calculates an estimation value of the second color based on the second color information and a difference between the first color information and the first target value of the first color (step S102).

(Item 3) The color correction apparatus according to item 1 or 2, wherein the correction unit corrects the first color based on a difference between the first color information and the first target value of the first color, and corrects the second color based on a difference between an estimation value of the second color and a second target value of the second color (step S25, S101, S103).

(Item 4) The color correction apparatus according to item 3, further comprising a first storage unit (35) that stores the first target value and the second target value.

(Item 5) The color correction apparatus according to any one of items 1 to 3, wherein the correction unit calculates an estimation value of the second color in accordance with a pattern that differs depending on a gradation of the second color (FIG. 8).

(Item 6) The color correction apparatus according to any one of items 1 to 4, wherein the correction unit calculates an estimation value of the second color in accordance with a pattern that differs depending on a toner color that forms the second color (FIG. 8).

(Item 7) The color correction apparatus according to any one of items 1 to 5, wherein the correction unit calculates an estimation value of the second color in accordance with a pattern that differs depending on a type of the recording medium (FIG. 8).

(Item 8) The color correction apparatus according to any one of items 1 to 6, further comprising a second storage unit (33) that stores an influence coefficient used to calculate an estimation value of the second color, wherein the correction unit calculates the estimation value of the second color using the influence coefficient (step S102).

(Item 9) The color correction apparatus according to item 8, wherein the correction unit is capable of calculating the influence coefficient (FIG. 12).

(Item 10) The color correction apparatus according to item 8 or 9, wherein the influence coefficient is a ratio of change of the second color information with respect to a change in a change amount of the first color information (FIG. 11).

(Item 11) The color correction apparatus according to any one of items 1 to 10, wherein the correction unit corrects the second color by changing an imaging parameter (step S25).

(Item 12) The color correction apparatus according to item 11, wherein the imaging parameter includes a development bias parameter (step S25).

(Item 13) The color correction apparatus according to item 11 or 12, wherein the imaging parameter includes an exposure amount parameter (step S25).

(Item 14) The color correction apparatus according to any one of items 1 to 13, wherein the correction unit specifies each of the first color information and the second color information using a value of a Lab color system (step S23).

(Item 15) The color correction apparatus according to any one of items 1 to 14, wherein the first color is an achromatic color and the second color is a chromatic color (FIG. 7).

(Item 16) An image forming apparatus (100), comprising the color correction apparatus (20) according to any one of items 1 to 15.

(Item 17) A method of controlling the color correction apparatus (20) according to item 17, the method comprising: obtaining first color information of a first image formed by a first color formed on a recording medium and second color information of a second image formed by a second color superimposed on the first color formed on the recording medium; and finding a correction value for the second color by estimating color information of the second color based on the first color information and the second color information, the color information of the second color being varied due to an influence in correcting the first color information to a first target value of the first color.

(Item 18) A program for causing a computer to perform the method according to item 17.

Although embodiments of the present invention have been described and illustrated in detail, the disclosed embodiments are made for purposes of illustration and example only and not limitation. The scope of the present invention should be interpreted by terms of the appended claims

What is claimed is:

1. A color correction apparatus comprising:
    a color sensor that obtains first color information of a first image formed by a first color formed on a recording medium and second color information of a second image formed by a second color superimposed on the first color formed on the recording medium; and
    a controller that finds a correction value for the second color by estimating color information of the second color based on the first color information and the second color information, the color information of the second color being varied due to an influence in correcting the first color information to a first target value of the first color,
    wherein the controller corrects the first color based on a difference between the first color information and the first target value of the first color, and corrects the second color based on a difference between an estimation value of the second color and a second target value of the second color.

2. The color correction apparatus according to claim 1, wherein the controller calculates the estimation value of the second color based on the second color information and the difference between the first color information and the first target value of the first color.

3. The color correction apparatus according to claim 1, further comprising a first storage unit that stores the first target value and the second target value.

4. The color correction apparatus according to claim 1, wherein the controller calculates the estimation value of the second color in accordance with a pattern that differs depending on a gradation of the second color.

5. The color correction apparatus according to claim 1, wherein the controller calculates the estimation value of the second color in accordance with a pattern that differs depending on a toner color that forms the second color.

6. The color correction apparatus according to claim 1, wherein the controller calculates the estimation value of the second color in accordance with a pattern that differs depending on a type of the recording medium.

7. The color correction apparatus according to claim 1, wherein the controller specifies each of the first color information and the second color information using a value of an LAB color system.

8. The color correction apparatus according to claim 1, wherein the first color is an achromatic color and the second color is a chromatic color.

9. An image forming apparatus, comprising the color correction apparatus according to claim 1.

10. A color correction apparatus comprising:
    a color sensor that obtains first color information of a first image formed by a first color formed on a recording medium and second color information of a second image formed by a second color superimposed on the first color formed on the recording medium;
    a controller that finds a correction value for the second color by estimating color information of the second color based on the first color information and the second color information, the color information of the second color being varied due to an influence in correcting the first color information to a first target value of the first color, and a storage unit that stores an influence coefficient used to calculate the estimation value of the second color, wherein the controller calculates the estimation value of the second color using the influence coefficient.

11. The color correction apparatus according to claim 10, wherein the controller is capable of calculating the influence coefficient.

12. The color correction apparatus according to claim 11, wherein the influence coefficient is a ratio of change of the second color information with respect to a change in a change amount of the first color information.

13. A color correction apparatus comprising:
a color sensor that obtains first color information of a first image formed by a first color formed on a recording medium and second color information of a second image formed by a second color superimposed on the first color formed on the recording medium;
a controller that finds a correction value for the second color by estimating color information of the second color based on the first color information and the second color information, the color information of the second color being varied due to an influence in correcting the first color information to a first target value of the first color, and
wherein the controller corrects the second color by changing an imaging parameter, the imaging parameter includes an exposure amount parameter.

14. The color correction apparatus according to claim 13, wherein the imaging parameter includes a development bias parameter.

15. A method of controlling a color correction apparatus, the method comprising:
obtaining first color information of a first image formed by a first color formed on a recording medium and second color information of a second image formed by a second color superimposed on the first color formed on the recording medium;

finding a correction value for the second color by estimating color information of the second color based on the first color information and the second color information, the color information of the second color being varied due to an influence in correcting the first color information to a first target value of the first color, and
correcting the first color based on a difference between the first color information and the first target value of the first color, and correcting the second color based on a difference between an estimation value of the second color and a second target value of the second color.

16. A non-transitory recording medium storing a computer readable program, the non-transitory recording medium comprising a program instruction for causing a computer to perform a method of controlling a color correction apparatus,
the method including:
obtaining first color information of a first image formed by a first color formed on a recording medium and second color information of a second image formed by a second color superimposed on the first color formed on the recording medium; and
finding a correction value for the second color by estimating color information of the second color based on the first color information and the second color information, the color information of the second color being varied due to an influence in correcting the first color information to a first target value of the first color, and
correcting the first color based on a difference between the first color information and the first target value of the first color, and correcting the second color based on a difference between an estimation value of the second color and a second target value of the second color.

* * * * *